INVENTORS
SUSUMU OHASHI
KEIGO SASAKI
BY

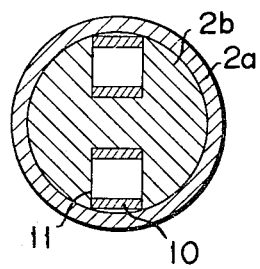
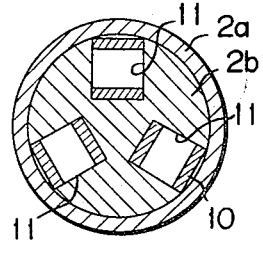
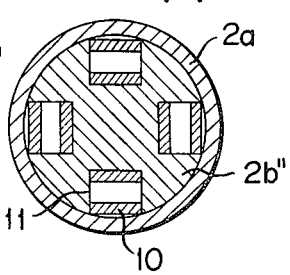
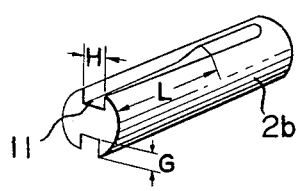
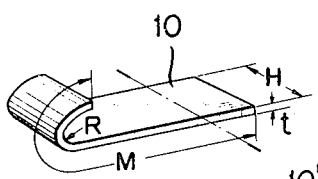
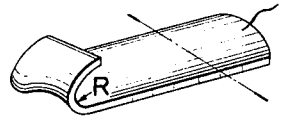
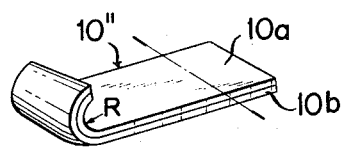
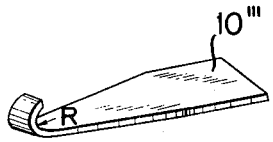
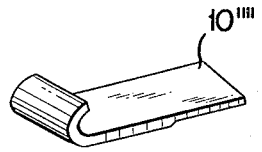

United States Patent Office 3,504,567
Patented Apr. 7, 1970

3,504,567
COLLAPSIBLE STEERING SHAFT CONSTRUCTION
Susumu Ohashi, Nagoya-shi, and Keigo Sasaki, Toyota-shi, Japan, assignors to Toyota Jidosha Kogyo Kabushiki Kaisha, Toyota-shi, Aichi-ken, Japan
Filed May 15, 1968, Ser. No. 729,149
Claims priority, application Japan, May 25, 1967, 42/33,213
Int. Cl. B62d 1/18
U.S. Cl. 74—492
8 Claims

ABSTRACT OF THE DISCLOSURE

A steering shaft construction, particularly for a vehicle, which is collapsible upon impact of the vehicle in a manner to absorb impact forces and prevent injury to a driver comprises a shaft divided axially into two parts which are telescopic in respect to each other. One of the parts fits into the other and is secured to the other by a connecting member which will deform under a predetermined force to permit the retarded telescopic movement of the two parts out of the way of the driver of the vehicle. The connecting member is designed as a shock absorbing member that is secured between the inner and outer parts in a manner to permit a gradual peeling off or deformation of the member and permits a controlled retarded telescopic movement to absorb the energy of impact in proportion to the amount of plastic deformation of the shock absorbing connecting member.

SUMMARY OF THE INVENTION

The invention relates in general to the construction of steering wheels of vehicles and in particular to a new and useful safety steering column construction including a steering shaft of two telescopic parts which will collapse together under an impact force such as in a collision.

Recent studies have indicated that many damaging wounds are inflicted to the driver of a vehicle by the steering column during impact. Attempts have been made to design steering columns such that they move out of the way of the operator during impact. However, if they move out of the way too quickly and the driver is not supported in his seat by seat belts, there is the likelihood that the driver will be moved by collision impact forwardly into the forward section of the vehicle and injure himself in any event.

In accordance with the present invention there is provided a steering column construction in which the steering shaft is made of two parts which are telescopic one within the other. A feature of the construction is that the two parts are connected by a shock-absorbing connecting member which permits a gradual reduction of the length of the steering wheel and an absorption of the shock energy by the deformation of the shock absorbing member as a result of a collision impact.

A preferred embodiment of the invention comprises a construction in which the outer portion of the steering wheel is made hollow to receive an inner or forward portion which is telescopic therein. The inner portion advantageously includes one or more recesses defined around its periphery which receive a deformable shock-absorbing connecting member. The member is advantageously connected to the inner part such as by tack welding and bent around a length of the wall of the outer part and over the exterior of this wall and secured thereto such as by tack welding. The construction is such that the connecting part will permit the telescopic movement of the two shaft parts during the absorption of the collision impact force as the driver moves against the steering wheel. The construction is such that the telescopic collapsing movement is in proportion to the energy of impact which is being absorbed as the connecting member peels away from each connecting part and deforms to permit the telescopic movement.

The inventive construction advantageously includes an exterior steering column which provides a bearing support for the rotation of the steering wheel and which in turn includes two parts which are telescopic relative to each other when the connecting elements holding these parts at a particular orientation are centered during a collision impact.

Accordingly, it is an object of the invention to provide an improved steering wheel constructed of a plurality of telescopic parts which will telescope gradually upon collision impact and forward movement of the driver to gradually absorb the impact force.

A further object of the invention is to provide a steering column construction which includes a steering shaft of at least two telescopic parts which are interconnected by a shock absorbing connecting member, the connecting member being deformable gradually to permit telescopic movement of the two parts upon being subjected to an impact force.

A further object of the invention is to provide a steering shaft construction in which an inner shaft portion is telescopically movable inside of a hollow outer shaft portion and wherein the inner shaft portion includes a plurality of recesses defined around the periphery each containing a connecting member which is deformable under impact force and which is connected at its respective ends to the interior shaft portion in the respective recesses thereof and to the exterior wall of the exterior shaft portion.

A further object of the invention is to provide a steering column assembly and a steering shaft construction which are simple in design, rugged in construction and economical to manufacture.

For a better understandng of the invention, its operating advantages and specific objects attained by its use, reference should be had to the accompanying drawings in which there are illustrated and described preferred embodiments of the invention.

BRIEF DESCRIPTION OF THE DRAWINGS

In the drawings:
FIG. 4a is a section taken along the line 4A—4A of FIG. 2;
FIGS. 4b and 4c are views similar to FIG. 4a but of different embodiments of the invention;
FIG. 5 is a perspective view of a grooved shaft part of the steering column indicated in FIG. 1;
FIGS. 6d to 6h are perspective views of different embodiments of deformable members which may be used to interconnect the two shaft parts.

DETAILED DESCRIPTION OF THE PREFERRED EMBODIMENT

Figure 1:
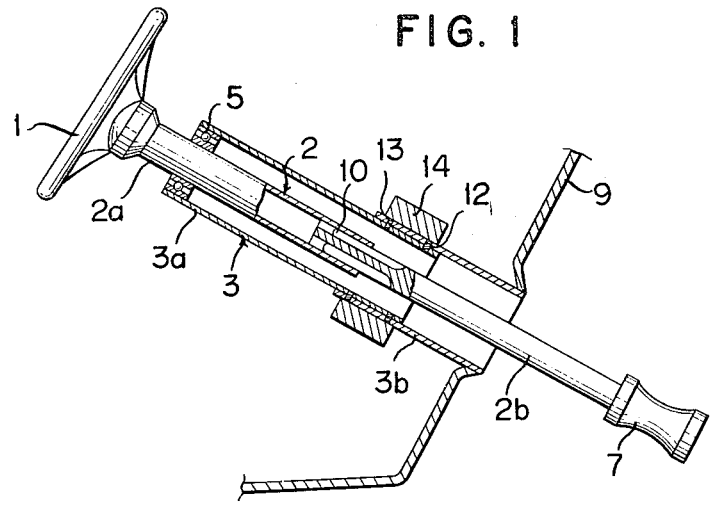
FIG. 1 is a partial elevational and partial longitudinal sectional view of a steering column assembly for a vehicle constructed in accordance with the invention.

Referring to the drawings in particular, the invention embodied therein in FIGS. 1 to 4a and 5 comprises a steering column assembly for a vehicle which includes a steering shaft generally designated 2 which carries a steering wheel 1 at its upper end and is coupled to a steering gear box 7 at its lower end. The steering shaft 2 is rotatably mounted within a steering column tube 3 concentrically on roller bearings 5.

In accordance with one aspect of the invention, the steering column tube 3 is divided into an upper tube part 3a and a lower tube part 3b. The lower tube part 3b is supported at its lower end on a floor board 9 of the vehicle and it overlaps the lower portion of the upper tube part 3a. The overlapping portions of both parts 3a and 3b are formed with a plurality of aligned radial bores 12 which are filled with synthetic resin 13 by injection molding to hold these two parts in the extended position indicated in FIG. 1. The resin 13 forms pins which are of a strength selected so that they may be easily sheared under a relatively small contracting stress exerted between the parts 3a and 3b in an axial direction. The tube 3 is supported in the vehicle by a securing bracket 14 which extends to a fixed part of the vehicle body (not shown).

In accordance with the invention, the steering shaft 2 is also divided into an upper shaft part 2a which, in the embodiment illustrated, is of hollow construction, and a lower solid shaft part 2b which extends into the lower end of the hollow part and is telescopic in respect thereto. The shaft parts 2a and 2b are interconnected by a deformable shock absorbing connecting member 10 which holds the parts in their extended orientation for driving operations but permits a retarded telescoping collapsing movement of the two parts when the steering shaft 2 is subject to an axial impact force such as one which would result when a driver is thrown against a steering wheel during a collision of the vehicle. As best seen in FIGS. 2, 3, 4a and 5, the solid shaft part 2b is provided with two longitudinally extending grooves 11 and 11' adjacent its upper or connecting end. Two connecting members 10, 10 are employed, each of which is formed in the shape of a strip of material such as a metal or plastic, but preferably a soft steel material which is bent into a U-shaped configuration. The strip 10 includes a curved end portion which conforms to the inner end of the groove 11 and is secured thereto such as by spot welding. A leg portion 10b of the strip extends along the interior wall of the upper part 2a and is bent in an opposite direction over the exterior wall of the outer part and secured to this wall such as by tack welding.

In the embodiment illustrated in FIGS. 1 to 4a, only two diametrically opposite recesses 11 are provided in the part 2b, however, in the embodiment illustrated in FIG. 4b, shaft part 2b' is provided with three recesses 11 for receiving similar parts 10, and in the embodiment of FIG. 4c, the shaft part 2b'' is provided with four recesses 11. In each of the embodiments, the spacing around the periphery of the grooves 11 is shown to be uniform but in some instances it may be desirable to make the construction nonsymmetrical.

When the steering column 2 and the steering column tube 3 are subjected to axially direct impact forces such as would occur when the driver of the vehicle is thrown against the steering wheel 1 during a collision accident, the shock will be transmitted to the steering shaft 2 to cause the parts 2a and 2b to move telescopically in a collapsing direction while gradually deforming the connecting members 10. The total movement may be by an amount indicated by the relative shifting of the two parts in FIG. 3 and would of course depend on the specific force applied and the amount of resistance offered by the connecting elements 10 which, of course, must be considered in their design and in the specific installation construction. Because the contraction of the part 2b within the part 2a is gradual due to the fact that the connection members 10 must deform, the impact of the driver against the steering wheel will be gradually absorbed without great injury to the driver. If the total movement of the two parts extends to the distance S indicated in FIG. 3, the steering column 2 will still be operational and the ordinary steering function may be carried out even after impact.

If the impact proceeds beyond a point at which the hub portion of the steerin wheel 1 contacts the bearings 5 and the tube 3, the tube 3 will also telescope after shearing the pins 13 so that the part 3a moves into the part 3b during the further collapsing movement of the shaft parts 2a and 2b. The force necessary to produce the shearing of the pins 13 is relatively small but it may absorb an initial shock energy sufficient to prevent material harm to the driver.

In the showings of FIGS. 6d to 6h, various embodiments of connecting member 10 are indicated. The connecting member 10 in FIG. 6d is made as a flat strip which is bent into the configuration indicated in FIG. 2. In FIG. 6e, the member 10' is arcuate in cross section and the member 10'' of FIG. 6f is made of two strip sheets 10a and 10b laminated to each other. In FIG. 6g, the connecting member 10''' is reduced in width toward the bent portion which is adapted to extend outwardly from the shaft part 2b to the shaft part 2a. In the construction shown in FIG. 6h, the connecting member 10'''' is made of different thicknesses along its longitudinal length.

Figure 2:
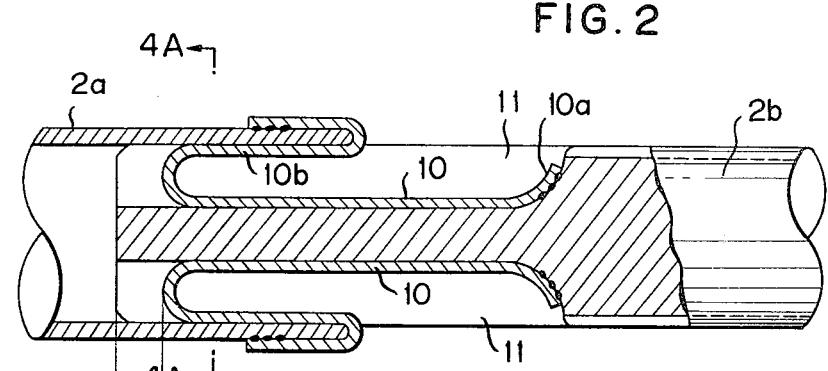
FIG. 2 is a partial enlarged longitudinal sectional view of the connection portion of the two shaft parts of the steering column indicated in FIG. 1.
Figure 3:
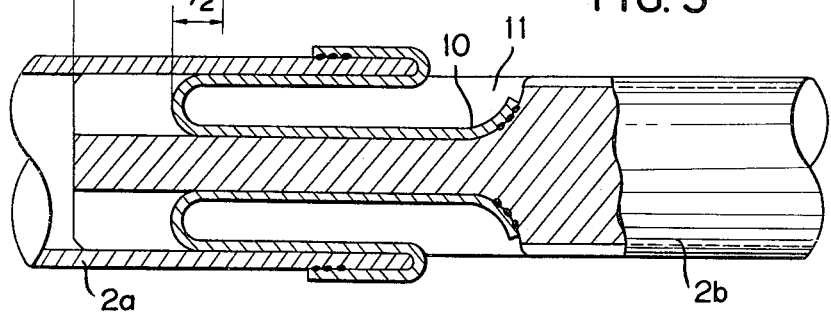
FIG. 3 is a view similar to FIG. 2 after deformation and some telescopic movement of the two parts of the steering column.
Figure 7:
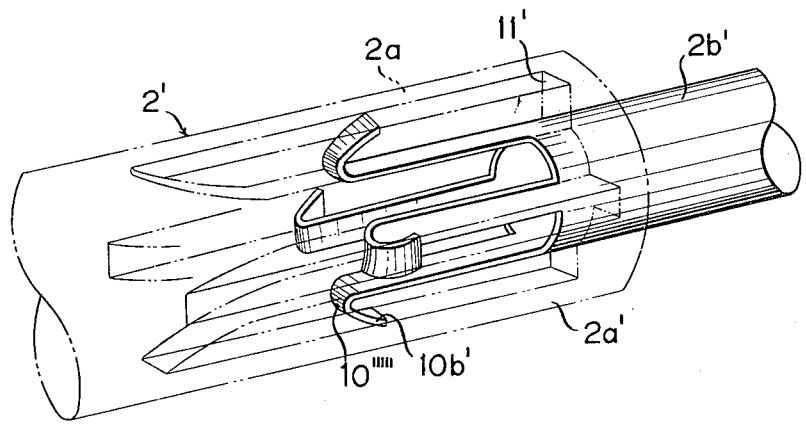
FIG. 7 is a schematic representation of another embodiment of the invention.
Figure 8:
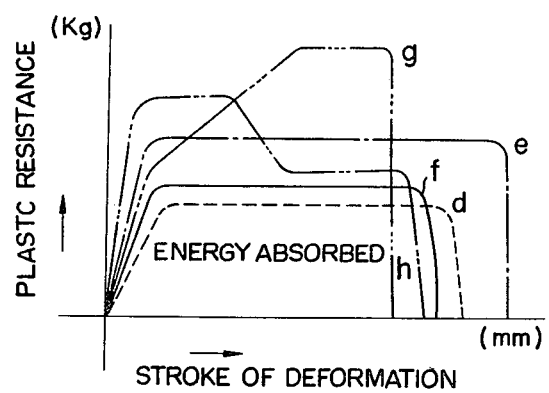
FIG. 8 is a graphic diagram of the energy absorbed due to the deformation of the connecting members of the various types indicated in FIGS. 6d to 6h.

In the graph indicated in FIG. 8, the characteristics of the various connecting elements 10–10'''' are indicated. The small letters d, e, f, g and h correspond to FIGS. 6d to 6h. As indicated in the diagram, the value of plastic resistance for the various curves remains substantially constant above a predetermined stroke of deformation. With the construction of the member 10''', as indicated in FIG. 6g, the curve increases gradually with the stroke of deformation. An opposite effect is achieved with the element 10'''' of FIG. 6h in which the curve h shows gradual decreasing of plastic resistance with the stroke of deformation. The energy absorbed, which is defined within the border lines of the curve, is of different amounts for each of the curves as indicated. In order to absorb a large amount of energy, it is preferable to increase the thickness of connecting member 10 and at the same time to curve it with respect to its longitudinal axis, as indicated in the embodiment of FIG. 6e. When the connecting member is made of the construction of the member 10' of FIG. 6f, the frictional resistance occurring between the sheets serves to absorb shock energy. The energy absorbed may also be increased when the radius of curvature R as defined between the leg parts 10a and 10b of the element 10 shown in FIGS. 2 and 6d is selected to be relatively small. In the shaft construction indicated in FIG. 7, the shaft part 2b' is hollowed at least toward the end thereof which fits into the hollow shaft part 2a'. The outer or upper shaft part 2a' is made as a relatively thick-walled cylinder having longitudinal grooves 11' defined along its inner surface. The shaft part 2b' is made of a relatively thin hollow cylinder having connecting members 10''''' which are formed as extensions of the wall thereof. The connecting members 10''''' are formed in a configuration of a U and include leg portions 10b' which extend into the groove 11' of the part 2a. The leg part 10b' may advantageously be as long as the longitudinal grooves 11' and they are advantageously welded to the wall at the interior of the groove.

Thus, the invention provides a simple structural steering column mechanism which includes two telescopic parts which may be interconnected by a connecting member in any number of a plurality of ways depending upon the amount of shock energy which is to be absorbed. The energy required to be absorbed may be calculated and corresponding elements 10 provided as desired. For example, the connecting member construction and the number of such connecting members may vary in accordance with the weight of the vehicle in which the steering column is installed and may be fixed in accordance with which of the impact absorbing movements of the two steering column parts will provide the most beneficial results for avoiding wounding the operator in the event of collision. The connection may be designed such that even in the event of impact and the collapsing of the steering shaft the vehicle may nevertheless be steered with the steering device. The provision of a plurality of grooves around the periphery of one of the shaft members and the arrangement of the particular design of connecting member which is to be installed in each groove provides a great range for a variation for energy absorption and for the amount of movement or impact energy which is to be absorbed for any collapsing movement of the two shaft parts.

While specific embodiments of the invention have been shown and described in detail to illustrate the application of the inventive principles, it will be understood that the invention may be embodied otherwise without departing from such principles.

We claim:

1. A vehicle steering shaft construction comprising a shaft having a plurality of shaft parts, at least two of said shaft parts being arranged to telescope axially one within the other into an overlapping relationship, one of said telescopic shaft parts being hollow, the other of said telescopic shaft parts being of solid formation and being arranged to telescope into said hollow shaft part, said solid shaft part having a longitudinal groove therein terminating at the end thereof which telescopes into said hollow shaft part, and connecting means connected between said telescopic shaft parts and holding them in an axially fixed orientation, said connecting means comprising a member of substantially U-shaped form having one leg in the groove of said solid shaft part and the other leg connected to said hollow shaft part, said connecting means being displaceable by a predetermined axial force on said shaft parts to permit relative collapsing movement of said telescopic shaft parts.

2. A vehicle steering shaft construction according to claim 1, wherein said connecting member extends along the inner surface of said hollow shaft part and has an end portion extending around the end and over the exterior of said hollow shaft part and is secured to said hollow shaft part exterior.

3. A vehicle steering shaft construction, according to claim 1, wherein said connecting means comprises a member projecting in the axial direction of said shaft and having a longitudinally extending strip shape formed of a deformable material, said member being disposed within the groove in the outer surface of said solid shaft part for a portion of its length and extending along and contacting the inner surface of said hollow shaft part for another portion of its length.

4. A vehicle steering shaft construction according to claim 3, wherein said strip member has a varying cross sectional area along its longitudinal axis.

5. A vehicle steering shaft construction, according to claim 3, wherein said strip member has an arcuate shape in a plane extending perpendicularly to its longitudinal direction.

6. A vehicle steering shaft construction, according to claim 3, wherein said strip member is formed by two similar strip sections laminated together.

7. A vehicle steering shaft construction, according to claim 3, wherein said strip member has a variable thickness along its length.

8. A vehicle steering shaft construction, according to claim 1, wherein said solid shaft part has a hollow cylinder projecting in the axial direction of said shaft into said hollow shaft part, and said connecting means comprising at least one strip-like member extending in the axial direction of said shaft from said hollow cylinder.

References Cited

UNITED STATES PATENTS

| | | | |
|---|---|---|---|
| 3,146,014 | 8/1964 | Kroell. | |
| 3,373,629 | 3/1968 | Wight et al. | 74—492 |
| 3,401,576 | 9/1968 | Eckels | 74—493 |

MILTON KAUFMAN, Primary Examiner

U.S. Cl. X.R.

188—1